Patented June 2, 1931

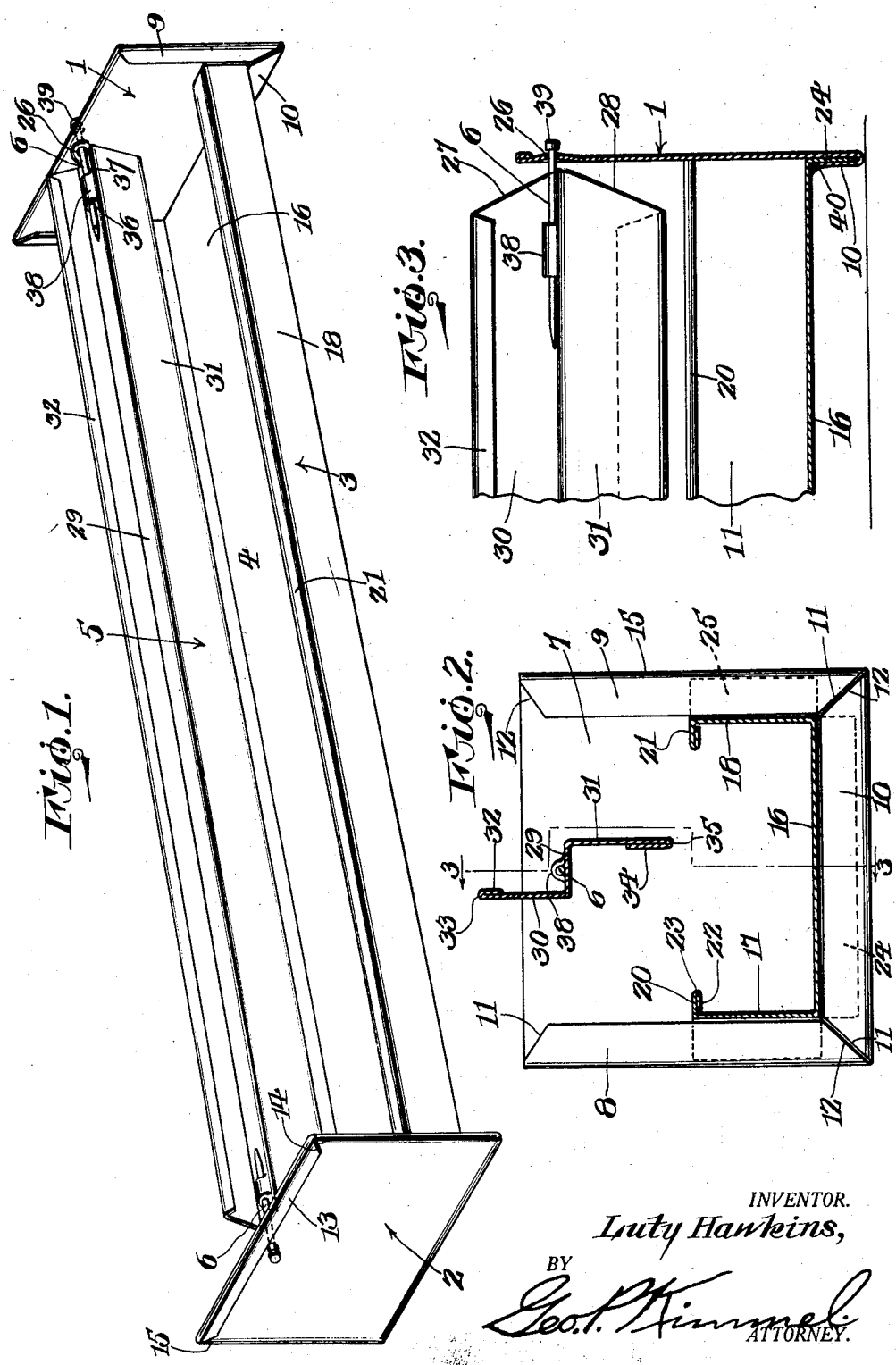

1,808,657

UNITED STATES PATENT OFFICE

LUTY HAWKINS, OF MOUNT VERNON, ILLINOIS

POULTRY FEEDER

Application filed May 20, 1929. Serial No. 364,612.

This invention relates to a poultry feeder and has for its object to provide, in a manner as hereinafter set forth, a device of the class referred to including a freely movable, oscillatory, counter-balanced guard for positioning over and lengthwise of the feeding compartment of the device and which acts to prevent the fowls roosting or perching over the feed or entering the feed compartment whereby the feed is prevented from becoming contaminated by the dropping of filth thereon from the fowls, but at the same time permitting of the fowls to have ready access to the feed when desired.

A further object of the invention is to provide, in a manner as hereinafter set forth, a device of the class referred to which not only can be employed for feeding purposes, but as a drinking pan for the fowls.

Further objects of the invention are to provide, in a manner as hereinafter set forth, a poultry feeder which is simple in its construction and arrangement, strong, durable, compact, sanitary, thoroughly efficient in its use, readily assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a perspective view of a poultry feeder in accordance with this invention.

Figure 2 is a fragmentary view partly in elevation and partly in longitudinal section of the device.

Figure 3 is a section on line 3—3 Figure 1.

A poultry feeder, in accordance with this invention may be of any suitable size, that is to say, of a size for use by small chicks, or for large chicks or for old hens.

The poultry feeder includes a pair of end members 1, 2 constituting supports, a body member 3 coacting with and connected to the end members 1, 2 to provide a feeding compartment 4 spaced above the ground, a freely movable, oscillatory, counter-balanced guard 5 and a pair of guard pivots 6 extending inwardly from the end members 1, 2.

As the end members 1, 2 are of like construction, but one will be described as the description of one will apply to the other. Each end member is formed from a sheet metal plate of the desired height and width and bent inwardly upon its inner face to provide a pair of side folds 8, 9 and a bottom fold 10. The folds have oppositely disposed, inclined end edges 11, 12 to provide what may be termed mitered joints at the lower ends of the folds 8, 9 with respect to the ends of the fold 10. The folds 8, 9 and 10 are slightly spaced from the inner face of the plate 7 and the latter has its upper portion inturned against its outer face to provide a fold 13 which snugly engages such outer face and has oppositely disposed, inclined end edges 14, 15.

The folds 8, 9, 10 and 13 set up the end member with reinforced edges 16.

The body member 3 is of the desired length and width, but the width thereof is less than the width of the end members 1, 2. The body member 3 is of channeled contour and the material from which said body member 3 is set up is bent to provide a bottom 16, a pair of vertically disposed sides 17, 18 and a pair of inwardly extending, oppositely disposed, right angular flanges 20, 21. The portions of the material which provide the flanges 20, 21 are bent upon themselves as at 22 to provide an upper and a lower fold abutting each other and whereby the free edges of the flanges 20, 21 will be rounded as indicated at 23. The flanges 20, 21 can be of any suitable width, but their length is coextensive with the length of the sides 17, 18. The flanges 20, 21 prevent waste of the feed carried by the compartment 4.

Each end of the bottom 16 of the body member 3 is formed with a depending flange 24 which is of a length corresponding to the width of the body 16. Each end of the side 17, as well as each end of the side 18 is formed with an outwardly directed, laterally disposed flange 25 of a height corresponding to the height of the side. The flanges 24 which depend from the bottom 16 are interposed between the bottom folds of the end members and the inner faces of such members. The flanges 25 which project from the ends of the sides 17 are interposed between the folds 8 of the end members and the inner faces of such members. The flanges 25 which project from the ends of the side 18 are positioned between the folds 9 of the end members and the inner faces of such members. The bottom 16 of the body member 13 seats upon the top edges of the bottom flanges 10 of the end members. The flanges 24, 25, in connection with the folds 8, 9 and 10 provide means for connecting the body member 3 to the end members and with such body member positioned a substantial distance above the bottom edges of the end members. The body member 3 can be shifted to connecting position with respect to the end members by sliding the same downwardly between the folds 8, 9 of said end members.

Each end member at its vertical median and in proximity to the bottom edge of the fold 13 is provided with an opening 26 for a purpose to be presently referred to. The openings in the end members 1, 2 are arranged in alignment.

The end members 1, 2 when the body member 3 is connected therewith form closed ends for the compartment 4. The sides of the compartment are provided by the sides 17, 18 of the body member. The sides 17, 18 of the body member 3 are materially less in height than the height of the end members 1, 2.

The guard 5 is formed from a length of sheet metal and it is positioned between the end members 1, 2 over the compartment 4. The length of the guard 5 is slightly less than the distance between the end members 1, 2. The sheet metal body from which the guard 5 is formed is of the desired length and width and has each end thereof oppositely inclined as indicated at 27, 28. The inclined portions at each of the ends of the guards extend in a direction toward the vertical median of the latter. The guard 5 includes an intermediate portion 29 and a pair of outer portions 30, 31. The portions 30, 31 extend in opposite directions with respect to the portion 29 and further extend in parallel planes. The portion 30 is of less width than the portion 31. The outer marginal part of the portion 30 is inturned to provide a fold 32 and which bears against one face of portion 30. The bend of the fold 32 provides a rounded edge 33 for the portion 30. The portion 31 has the outer marginal part thereof inturned to provide a fold 34 and the bend of the fold forms the outer edge 35 of the portion 31 of rounded contour.

The fold 34 is of greater width than the fold 32. The portion 31 in connection with the fold 34 forms a counter-balance for the guard 5. The portion 29 of the guard 5 is of materially less width than either of portions 30, 31. The portion 31 from its rounded edge 35 to its point of joinder with the portion 29 is of greater width than portion 30 from its rounded edge 33 to its point of joinder with the portion 29.

The portion 29 in proximity to each end thereof is provided with a pair of slits 36, 37 arranged in spaced relation and the material freed by the slits is pressed outwardly as at 38 to provide a bearing for a pin or pivot 6. Each pin or pivot 6 has a head 39 at its outer end and such pivot extends through an opening 26, bears against one face of the intermediate portion and has the offset 38 surround an intermediate part thereof. The pivot 6, in connection with the offset portion 38 provides means for pivotally supporting the guard 5. The connection between the guard 5 and the pivots is such as to permit of the guard to be freely movable. Owing to the manner of setting up the guard 5 with respect to the end members 1, 2 the guard will be capable of oscillating on its pivot, and will be normally maintained in an upright position, such as shown in Figure 2, due to the counter balance therefor. The pivots 6 are disposed at the longitudinal median of the portion 29 of the guard 5. The portion 29 of the guard 5 is disposed in alignment with respect to the longitudinal median of the compartment 4. When the guard is set up the portion 30 thereof is disposed between the longitudinal median of the compartment 4 and one side of the latter and the portion 31 of the guard is disposed between the longitudinal median of the compartment 4 and the other side of the latter.

The free longitudinal edge 35 of the portion 31 is disposed slightly above the open top of compartment 4 when the guard is in normal position.

To provide for the feeder being employed as a watering pan the joint connections between the body member 3 and end members 1, 2 can be soldered as indicated at 40. See Figure 1.

It is thought the many advantages of a poultry feeder, in accordance with this invention can be readily understood, and although the preferred embodiment of the invention is as illustrated and described, yet it is to be understood that changes in the details of construction can be had which will fall within the scope of the invention as claimed.

What I claim is:

1. In a poultry feeder a pair of end members provided with inwardly extending folds at the sides and bottoms to oppose, in spaced relation, the inner faces thereof, a channel-shaped body member having depending flanges at its bottom and laterally disposed, outwardly directed flanges at its sides, said flanges extending between said folds and inner faces of the body of said end members for connecting said body member to and between said end members, said body member seating on the top edges of the folds at the bottoms of said end members.

2. A poultry feeder comprising a pair of end members provided with inturned side folds and upwardly extending bottom folds, said folds of each member opposing one face thereof and spaced from such face, a channel-shaped body member open at each end and having a depending flange at each end of its bottom corresponding in length to the width of said bottom, said bottom flanges interposed between the bottom folds of said members and faces of the members which the bottom flanges oppose, said bottom of said body member seating on the top edge of said bottom folds, said body member further having at each end of each side thereof an outwardly directed, right angularly disposed, vertically extending flange, said vertical flanges interposed between said side folds of said end members and that face of the end members which the side folds are spaced from, and said body member further having each of its sides at the upper end thereof formed with an inwardly extending, right angularly disposed flange having a rounded free edge.

3. In a poultry feeder, a pair of end members provided with inwardly extending folds at the sides and bottoms to oppose, in spaced relation, the inner faces thereof, an open top, channel-shaped body member having depending flanges at the ends of its bottom and laterally disposed, outwardly directed flanges at the ends of its sides, said flanges extending between said folds and the body of the end members for connecting said channel-shaped body member to and between said end members, said channel-shaped body member seating on the top edges of the folds at the bottoms of said end members, the open top of said channel-shaped body member arranged a substantial distance below the top edges of said end members.

4. In a poultry feeder, a pair of end members provided with inwardly extending folds at the sides and bottoms to oppose, in spaced relation, the inner faces thereof, an open top, channel-shaped body member having depending flanges at the ends of its bottom and laterally disposed, outwardly directed flanges at the ends of its sides, said flanges extending between said folds and the body of the end members for connecting said channel-shaped body member to and between said end members, said channel-shaped body member seating on the top edges of the folds at the bottoms of said end members, the open top of said channel-shaped body member arranged a substantial distance below the top edges of said end members, said channel-shaped body member having each side thereof at its top formed with an inwardly extending flange co-extensive with the length of the sides.

In testimony whereof, I affix my signature hereto.

LUTY HAWKINS.